US006750437B2

(12) United States Patent
Yamashita et al.

(10) Patent No.: US 6,750,437 B2
(45) Date of Patent: Jun. 15, 2004

(54) IMAGE PICKUP APPARATUS THAT SUITABLY ADJUSTS A FOCUS

(75) Inventors: Yuichiro Yamashita, Kanagawa (JP); Tetsuya Itano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/935,842

(22) Filed: Aug. 24, 2001

(65) Prior Publication Data

US 2002/0036257 A1 Mar. 28, 2002

(30) Foreign Application Priority Data

Aug. 28, 2000 (JP) ........................................ 2000-257546
Sep. 26, 2000 (JP) ........................................ 2000-292530

(51) Int. Cl.[7] ............................ H01L 27/00; H04N 3/14
(52) U.S. Cl. .................................... 250/208.1; 348/294
(58) Field of Search .............................. 250/208.1, 216, 250/208.2, 226; 257/294; 348/294, 301, 303, 308, 311, 320–324

(56) References Cited

U.S. PATENT DOCUMENTS

| 4,410,804 A | * | 10/1983 | Stauffer | .................. | 250/208.2 |
| 5,426,292 A | * | 6/1995 | Bird et al. | ............... | 250/208.1 |
| 5,451,766 A | * | 9/1995 | Van Berkel | ............... | 250/208.1 |
| 5,463,216 A | * | 10/1995 | Van Berkel | ............... | 250/208.1 |
| 5,471,515 A | * | 11/1995 | Fossum et al. | ................ | 377/60 |
| 5,949,483 A | * | 9/1999 | Fossum et al. | .......... | 250/208.1 |
| 6,137,535 A | * | 10/2000 | Meyers | ........................ | 348/340 |
| 6,141,048 A | * | 10/2000 | Meyers | ........................ | 348/294 |

* cited by examiner

Primary Examiner—Stephone B. Allen
(74) Attorney, Agent, or Firm—Fitzpatrick, Cella, Harper & Scinto

(57) ABSTRACT

The present invention provides an image pickup apparatus which comprises: first and second photoelectric conversion units each including a plurality of photoelectric conversion elements; an image forming unit that forms images viewed from different points on the plurality of photoelectric conversion elements included in each of the first and second photoelectric conversion units; a first holding unit for holding signals from the first photoelectric conversion unit, the first holding unit having at least the same number of capacitors as the number of the photoelectric conversion elements included in the first photoelectric conversion unit; a second holding unit for holding signals from the second photoelectric conversion unit, the second holding unit having at least the same number of capacitors as the number of the photoelectric conversion elements included in the second photoelectric conversion unit; and a first common output line to which signals are read out from the plurality of capacitors included in each of the first and second holding units.

8 Claims, 13 Drawing Sheets

■ · · · PIXEL WHOSE PHOTOELECTRIC CONVERSION PORTION IS DIVIDED INTO A PLURALITY OF PARTS

☐ · · · PIXEL WHOSE PHOTOELECTRIC CONVERSION PORTION IS NOT DIVIDED

PIXEL WHOSE PHOTOELECTRIC CONVERSION PORTION IS DIVIDED

PIXEL WHOSE PHOTOELECTRIC
CONVERSION PORTION IS NOT DIVIDED

■ ··· PIXEL WHOSE PHOTOELECTRIC CONVERSION PORTION IS DIVIDED INTO A PLURALITY OF PARTS

□ ▨ ··· PIXEL WHOSE PHOTOELECTRIC CONVERSION PORTION IS NOT DIVIDED

■ · · · PIXEL WHOSE PHOTOELECTRIC CONVERSION
   PORTION IS DIVIDED INTO A PLURALITY OF PARTS

□ ▨ · · · PIXEL WHOSE PHOTOELECTRIC CONVERSION
   PORTION IS NOT DIVIDED

■ · · · PIXEL WHOSE PHOTOELECTRIC CONVERSION
   PORTION IS DIVIDED INTO A PLURALITY OF PARTS

□ ▨ · · · PIXEL WHOSE PHOTOELECTRIC CONVERSION
   PORTION IS NOT DIVIDED

IMAGE PICKUP APPARATUS THAT SUITABLY ADJUSTS A FOCUS

BACKGROUND OF THE INVENTION

1. Field of the Invention

This invention relates to an image pickup apparatus for picking up an object image and an image pickup system including the apparatus.

2. Related Background Art

U.S. Pat. No. 4,410,804 discloses a conventional image pickup apparatus in which one microlens is provided for a plurality of photoelectric conversion elements to expose the respective photoelectric conversion elements to projected images obtained from different points of view and thereby detect the distance based on a phase difference detecting method.

FIG. 1 is a plan view showing a solid-state image pickup element disclosed in U.S. Pat. No. 4,410,804 or the like. FIG. 1 shows that pixels 205 each having a plurality of photodiodes 201 to 204 are formed on a matrix. A common microlens (not shown) is placed above the pixels 205, and exposure signals of images obtained from the different points of view are accumulated in the respective photodiodes 201 to 204.

Exposure signals of images obtained from a same point of view are accumulated in the photodiodes 201 to 204 denoted by the same reference numerals in each of the pixels 205. Exposure signals of images obtained from the different points of view are accumulated in the photodiodes 201 to 204 in each of the pixels 205. An amount of a shift in focus can be found by correlating the exposure signals of images obtained from the different points of view.

SUMMARY OF THE INVENTION

An object of the present invention is to provide an image pickup apparatus capable of suitably adjusting a focus. To achieve the above object, according to one aspect of the present invention, there is provided an image pickup apparatus comprising: first and second photoelectric conversion units each including a plurality of photoelectric conversion elements; an image forming unit that forms images viewed from different points on the plurality of photoelectric conversion elements included in each of the first and second photoelectric conversion units; a first holding unit for holding signals from the first photoelectric conversion unit, the first holding unit having at least the same number of capacitors as the number of the plurality of photoelectric conversion elements included in the first photoelectric conversion unit; a second holding unit for holding signals from the second photoelectric conversion unit, the second holding unit having at least the same number of capacitors as the number of the plurality of photoelectric conversion elements included in the second photoelectric conversion unit; and a first common output line to which signals are read out from the plurality of capacitors included in each of the first and second holding units.

Also, according to another aspect of the present invention, there is provided an image pickup apparatus comprising: first and second photoelectric conversion units each including a plurality of photoelectric conversion elements; microlenses provided respectively in the first and second photoelectric electric conversion units, for focusing light onto the plurality of photoelectric conversion elements included in each of the first and second photoelectric conversion units; a first holding unit for holding signals from the first photoelectric conversion unit, the first holding unit having at least the same number of capacitors as the number of the plurality of photoelectric conversion elements included in the first photoelectric conversion unit; a second holding unit for holding signals from the second photoelectric conversion unit, the second holding unit having at least the same number of capacitors as the number of the plurality of photoelectric conversion elements included in the second photoelectric conversion unit; and a first common output line to which signals are read out from the plurality of capacitors included in the respective ones of the first and second holding units.

According to still another aspect of the present invention, there is provided an image pickup apparatus comprising: an image pickup area having a plurality of photoelectric conversion elements; and a plurality of microlenses that focus light onto the plurality of photoelectric conversion elements; wherein one microlens is provided for every one photoelectric conversion element in a first image pickup region in the image pickup area, and one microlens is provided for every a plurality of photoelectric conversion elements in a second image pickup region in the image pickup area.

Other objects and features of the present invention will become apparent from the following description of the embodiments taken in conjunction with the accompanying drawings.

DETAILED DESCRIPTION OF THE PREFERRED EMBODIMENTS

Preferred embodiments of the present invention will hereinafter be described with reference to the accompanying drawings.

Figure 1:
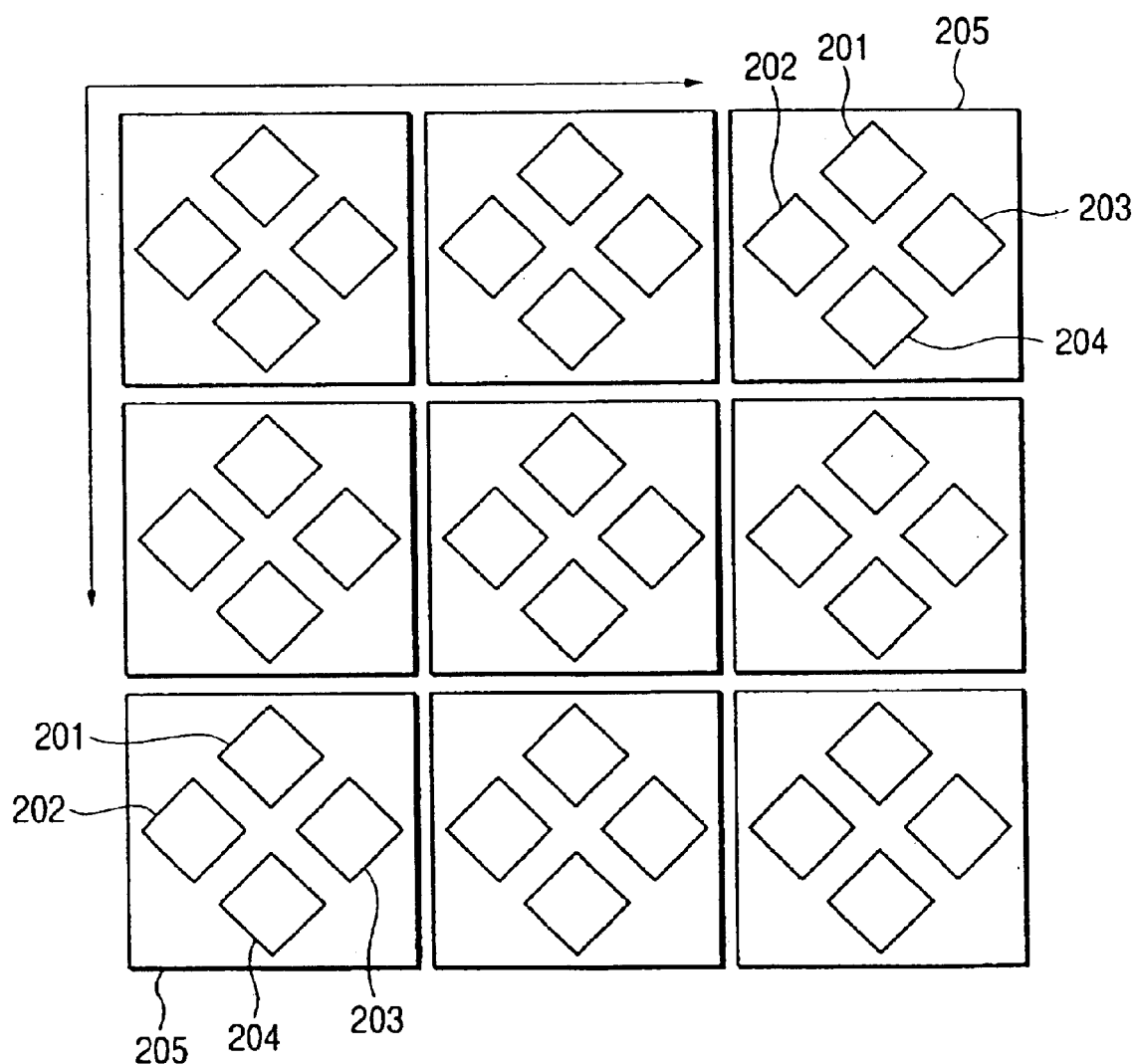
FIG. 1 is a diagram showing a structure of a conventional solid-state image pickup element.
Figure 2:
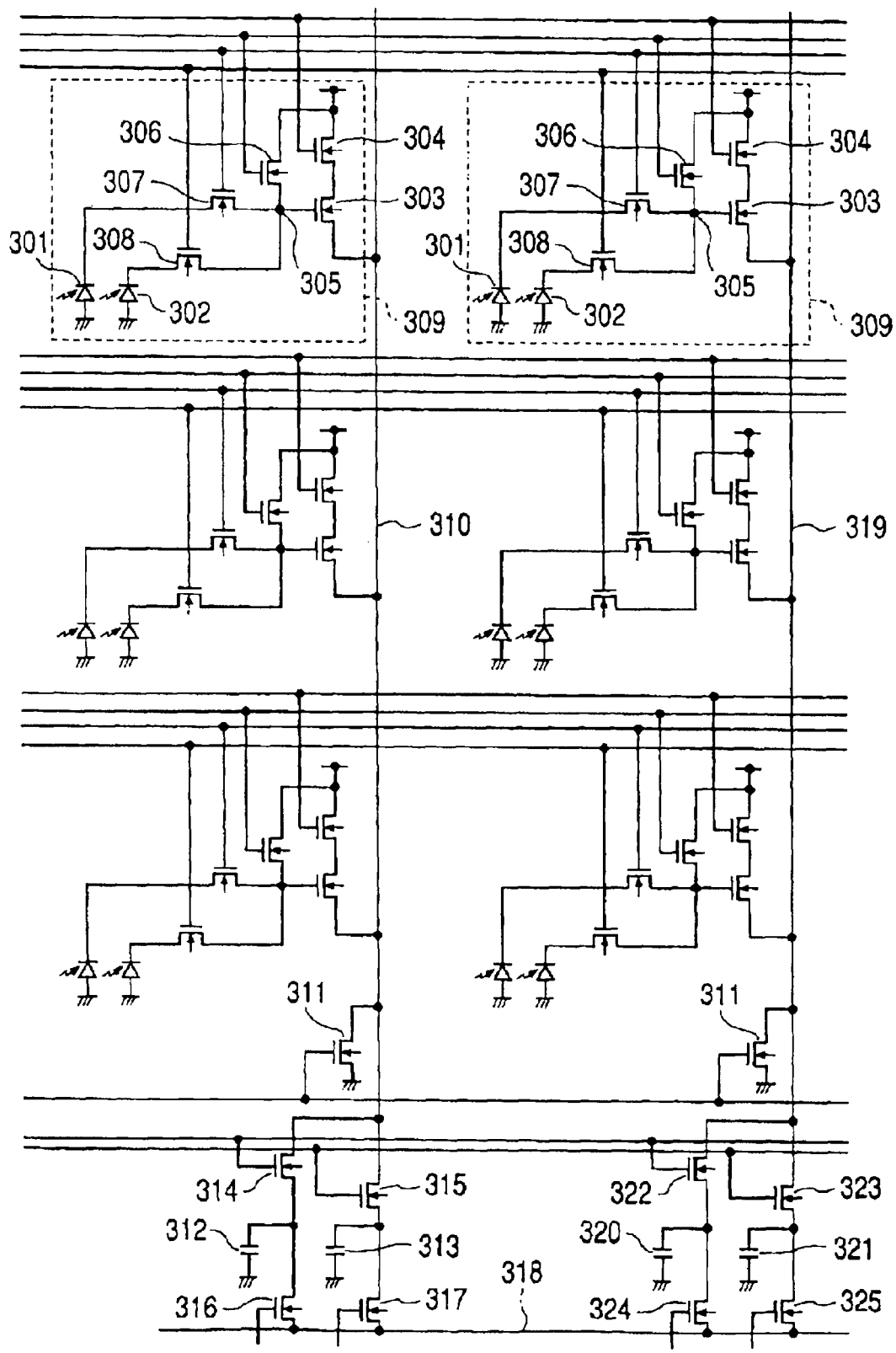
FIG. 2 is a diagram showing a structure of a solid-state image pickup element according to a first embodiment of the present invention.

FIG. 2 is a diagram showing the structure of a solid-state image pickup element according to the first embodiment of the present invention. As shown in FIG. 2, according to the present embodiment, the number of photodiodes 301, 302 is equal to the number of capacitors 312, 313 and 320, 321, which are elements provided in different rows. The photodiodes 301, 302 are connected to the capacitors 312, 313 and 320, 321, respectively, through common vertical output lines 310, 319.

FIG. 2 shows pixels 309 (photoelectric conversion unit) arranged in a matrix, each of the pixels 309 comprising: the photoelectric conversion elements (photodiodes) 301, 302 for accumulating exposure signals of images obtained from different viewpoints; a source follower circuit 303 for outputting an amplification signal based on signals from the photodiodes 301, 302; a selection switch 304 for outputting a signal to the source follower circuit 303; a floating diffusion 305 for floating the signals from the photodiodes 301, 302; a reset switch 306 for resetting the potential of the floating diffusion 305 or the like; and transfer switches 307, 308 for transferring the signals from the photodiodes 301, 302 to the floating diffusion 305.

Figure 3:
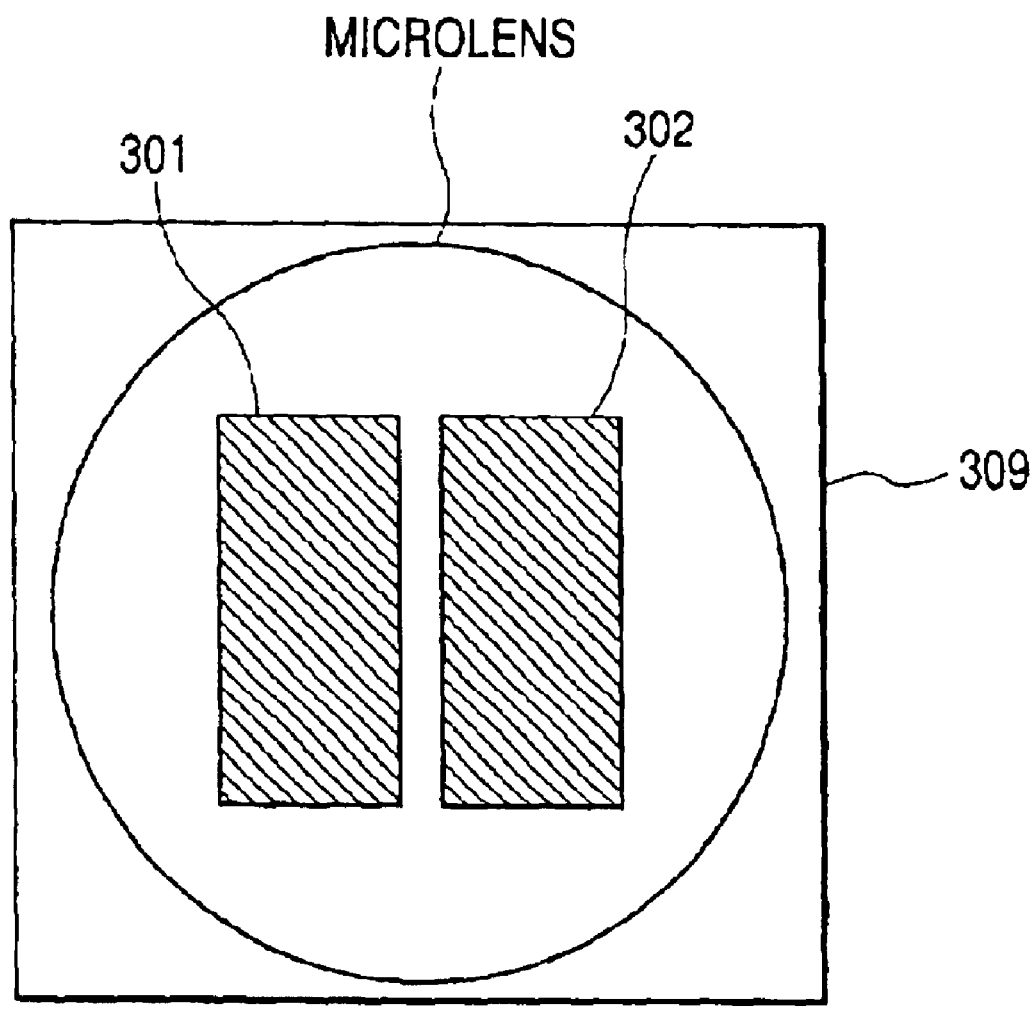
FIG. 3 is a diagram showing a part of the solid-state image pickup element.

It should be understood, however, that there is no intention to limit the structure of the pixel 309 to the one shown in FIG. 2. For example, one switch may be used as both the reset switch 306 and the selection switch 304. Incidentally, a condenser lens such as a microlens and a color filter are provided on each of the pixels 309. As shown in FIG. 3, one microlens is provided for one pixel (a plurality of photoelectric conversion elements).

FIG. 2 also shows the vertical output line 310 that is commonly connected to output terminals of the source follower circuits 303 in different rows; a load current source 311 that is connected to the vertical output lines 310, 319; capacitors 312, 313, 320, 321 that hold signals transferred from the photodiodes 301, 302 via the vertical output line 310; switches 314, 315, 322, 323 that connects the capacitors 312, 313, 320, 321 to the vertical output lines 310, 319; a horizontal output line 318 that outputs signals held by the capacitors 312, 313 to the outside; and switches 316, 317, 324, 325 serving as transfer means that connects the capacitors 312, 313 to the horizontal output line 318.

Here, a "pixel" corresponds to a point indicating a color and a brightness at an arbitrary position on a picked-up image. Of course, the pixel does not strictly correspond to one point since a single-plate image sensor generates a color by carrying out an arithmetic operation using peripheral pixels. In such a case, it is assumed that the pixel corresponds to one point that is the center of a kernel in the arithmetic operation.

A "photodiode" has a function of storing photoelectric conversion results in a substantially electrically independent manner. Unlike the pixel, the photodiode should not necessarily correspond to one point on the picked-up image. For example, ten photodiodes may correspond to one point on a picked-up image. This is the difference between the photodiode and the pixel.

The term "electrically independent manner" means that when a photodiode holds electric charges generated by the incidence of a light, the held electric charges never interfere with another photodiode. The "substantially independent manner" means that, in a normal semiconductor, the number of electric charges transferred between independent photodiodes never becomes zero due to the mechanism such as diffusion but this is not taken into consideration.

The switches 304, 306 to 308, 311, 314 to 317, and 322 to 325 are turned on and off under the control of a shift register and a decoder. FIG. 2 shows the arrangement of the pixels 309 in three rows and two columns, but actually, a large number of pixels are arranged. Moreover, the pixels 309 should not necessarily be arranged in a matrix but may be arranged in a form of a honeycomb or the like.

In FIG. 2, the capacitors 312, 313, 320, 321 and the switches 314 to 317, 322 to 325 are used as sample hold devices. However, it is possible to additionally provide an amplifier that amplifies the voltage of the capacitors 312, etc. and an A/D converter that converts the voltage of the capacitors 312, etc. from analog form to digital form.

There will now be described the operation of the solid-state image pickup element shown in FIG. 2. First, a line is arbitrarily selected, and a signal from the photodiode 301 is transferred to the floating diffusion 305 via the transfer switch 307. The signal transferred to the floating diffusion 305 turns on a gate of the source follower circuit 303. On this occasion, if the selection switch 304 and the load current source 311 are ON, amplification signals based on the signal from the photodiode 301 are outputted to the vertical output lines 310, 319.

If the switches 314, 322 are then turned on, the amplification signals outputted to the vertical output lines 310, 319 are transmitted to the capacitors 312, 320. If the switches 314, 322 are then turned off, the amplification signals are held in the capacitors 312, 320. The reset switch 306 is then turned on to reset the potential of the floating diffusion 305.

Likewise, the signals amplified by the transfer of signals from the photodiode 302 through the transfer switch 308 are held in the capacitors 313, 321 by turning on the switches 315, 323. This sequence of operations is carried out at the same time for all the pixels 309 in the same line.

The switches 316, 324 are then turned on to transfer the amplification signals held in each of the capacitors 312, 320 to the horizontal output line 318. Then, switches 317, 325 are turned on to transfer the amplification signals held in the capacitors 313, 321 to the horizontal output line 318, and the switches 316, 317 are turned on to transfer the amplification signals held in each of the capacitors 312, 313 to the horizontal output line 318. The switches 324, 325 are then turned on to transfer the amplification signals held in each of the capacitors 320, 321 to the horizontal output line 318. It should be noted that focusing is detected from the signals transferred to the horizontal output line 318 by a phase difference detecting system.

Although the present invention is applied to a CMOS image sensor according to the present embodiment, the present invention may also be applied to other image sensors such as a CMD (Charge Modulation Device). Further, the photodiodes 301, 302, etc. may be formed on various types of semiconductor substrates made of silicon or the like.

It is possible to reduce the shift in a storage timing by providing the capacitors 312, 313, 320, 321 the number of which corresponds to the number of photodiodes 301, 302, in front of the switches 316, 317, 324, 325 as stated above.

Figure 4:
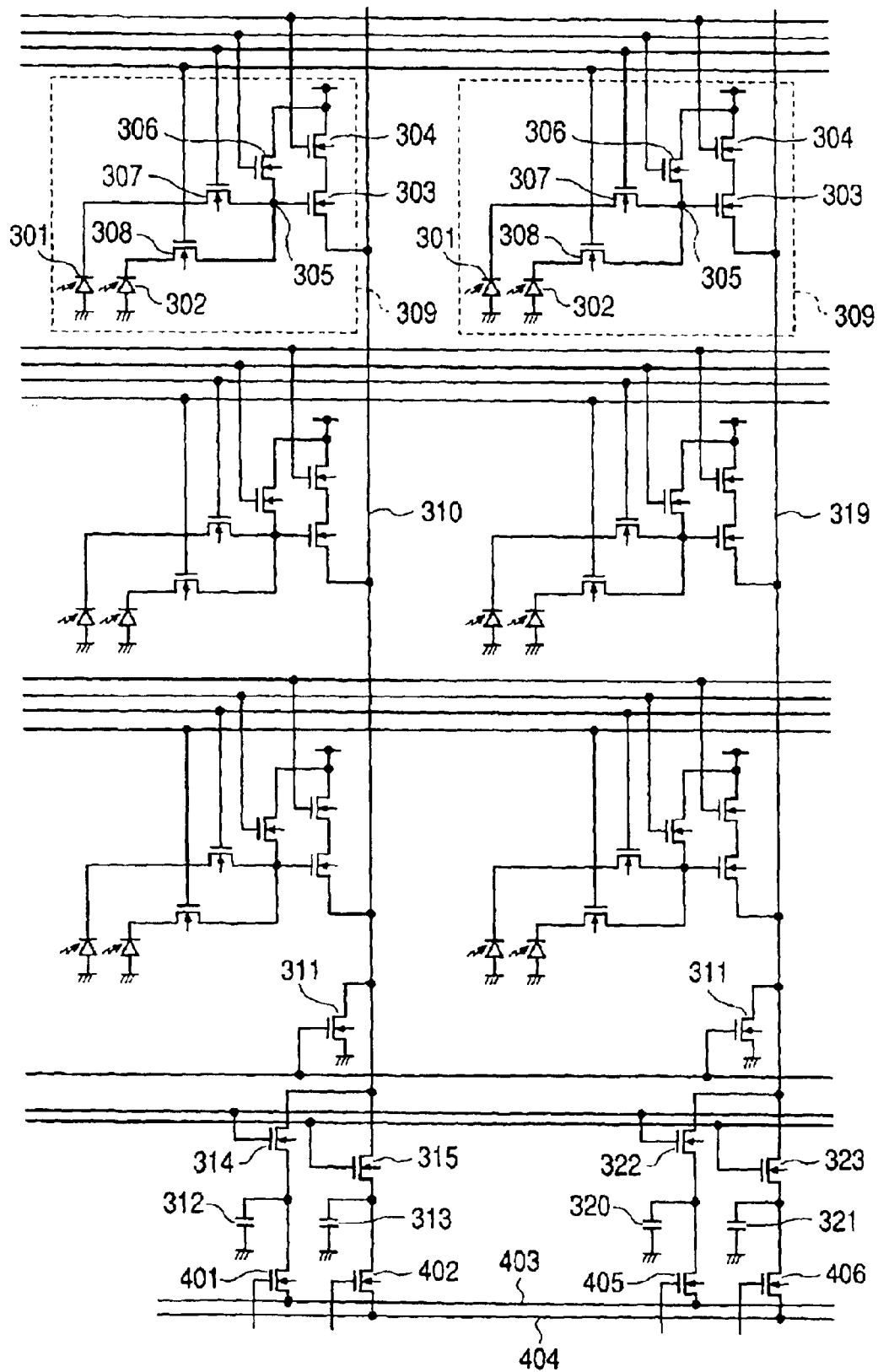
FIG. 4 is a diagram showing the structure of the solid-state image pickup element according to a second embodiment of the present invention.

FIG. 4 is a diagram showing the structure of a solid-state image pickup element according to the second embodiment of the present invention. As shown in FIG. 4, there are provided two horizontal output lines 403, 404 according to the present embodiment. The capacitors 312, 320 are connected to the horizontal output line 403 via switches 401, 405, and the capacitors 313, 321 are connected to the horizontal output line 404 via switches 402, 406. It should be understood, however, that there is no intention to limit the structure of the pixel 309 to the one shown in FIG. 4 in the present embodiment. Note that, in FIG. 4, parts similar to those described in FIG. 2 are denoted by the same reference numerals.

According to the present embodiment, the horizontal output lines 403, 404 the number of which corresponds to the number of capacitors 312, 313, 320, 321, are provided to output amplification signals held in the capacitors 312, 313, 320, 321 at a high speed.

It is possible to reduce the shift in a storage timing by providing the capacitors 312, 313, 320, 321 the number of which corresponds to the number of photodiodes 301, 302, in front of the switches 401, 402, 405, 406 as stated above.

Figure 5:
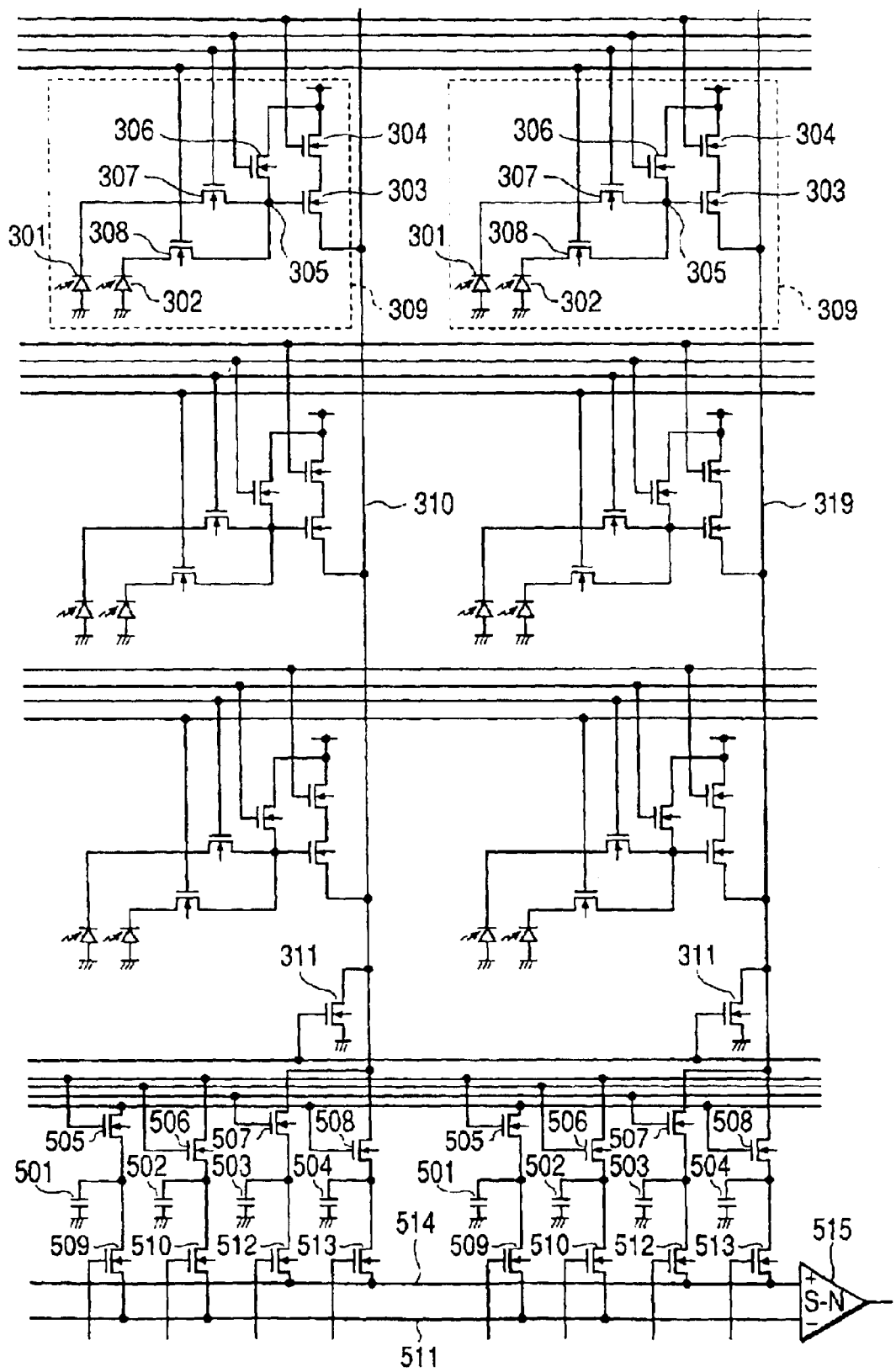
FIG. 5 is a diagram showing the structure of the solid-state image pickup element according to a third embodiment of the present invention.

FIG. 5 is a diagram showing the structure of a solid-state image pickup element according to the third embodiment of the present invention. As shown in FIG. 5, according to the present embodiment, capacitors the number of which is twice as many as that of the photodiodes 301, 303 are connected to the vertical output lines 310, 319 via respective switches 505 to 508. There is also provided a differential circuit 515 that differences signals outputted through horizontal output lines 514, 511, which correspond to the horizontal output lines 403, 404 in FIG. 2. It should be understood, however, that there is no intention to limit the structure of the pixel 309 to the one shown in FIG. 5. Note that, in FIG. 5, parts similar to those described in FIG. 2 are denoted by the same reference numerals.

The capacitors 501, 502 correspond to, for example, the capacitors 312, 313 in FIG. 2. The capacitors 503, 504 are provided so as to eliminate noise components in signals held in the capacitors 501, 502. As is the case with the first embodiment stated above, once amplification signals based on signals from the photodiodes 301, 302 are read out, the potential of the floating diffusion 305 is reset. On this occasion, a thermal noise (KTC noise) is generated by turning on/off the reset switch 306.

In addition, fixed pattern noise is generated in the source follower circuit 303. Such noises are included in the signals held in the capacitors 501, 502. Thus, only noise components are held in the capacitors 503, 504, and the differential circuit 515 subtracts the signals held in the capacitors 503, 504 from the signals held in the capacitors 501, 502 to thereby eliminate noise components.

By performing the above operations, correlative reset noises and the like are subtracted from signals to thereby read out signals with a high ratio of S/N to the outside according to the present embodiment.

It is possible to reduce the shift in a storage timing by providing the capacitors 501 to 504 the number of which corresponds to that of the photodiodes 301, 302, in front of the switches 509 to 514 as stated above.

Figure 6:
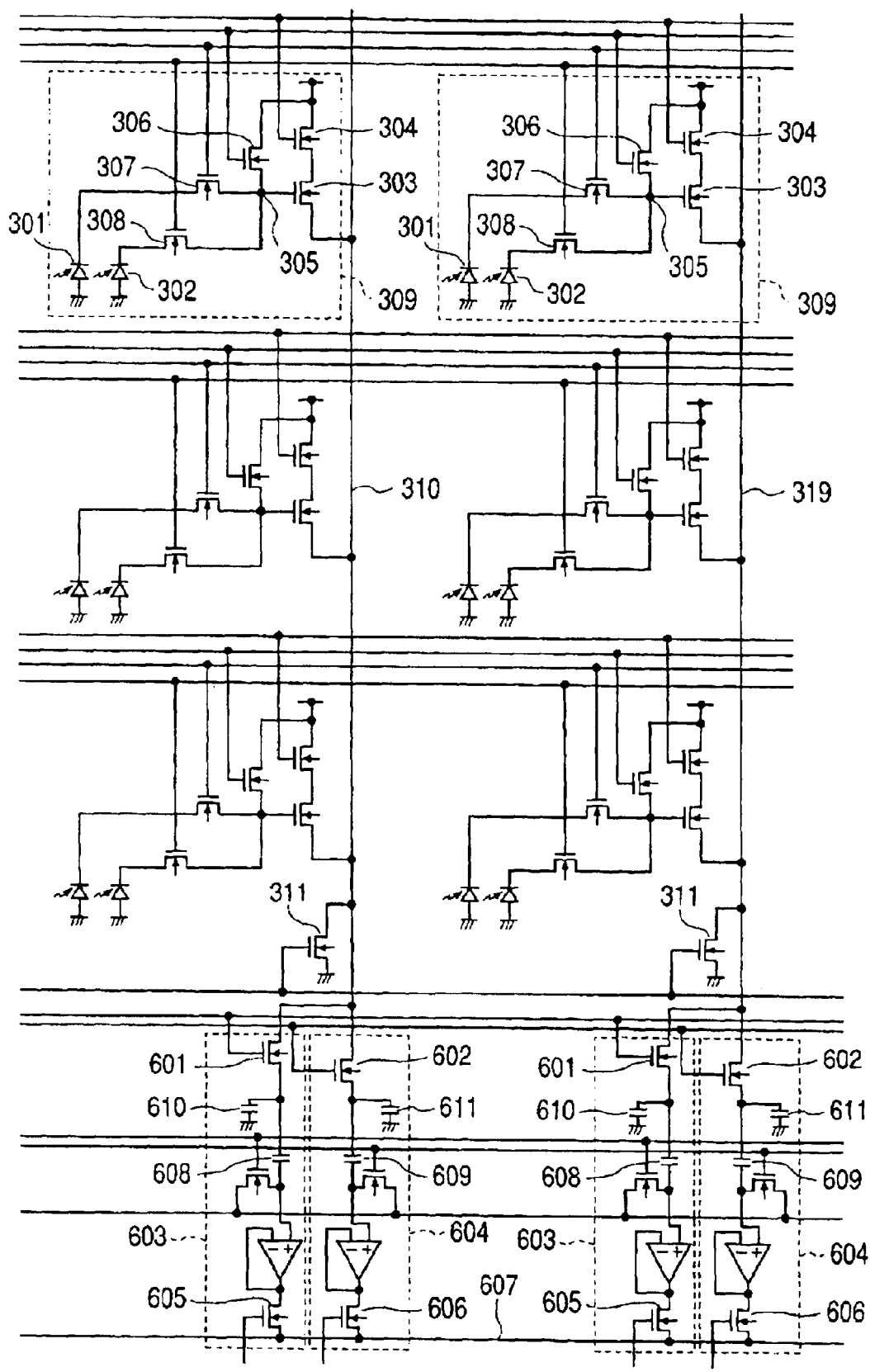
FIG. 6 is a diagram showing the structure of the solid-state image pickup element according to a fourth embodiment of the present invention.

FIG. 6 is a diagram showing the structure of a solid-state image pickup element according to the fourth embodiment of the present invention. As is the case with the solid-state image pickup element shown in FIG. 5, the solid-state image pickup element is used to eliminate noise components of amplification signals. As shown in FIG. 6, the solid-state image pickup element of the present embodiment has clamp capacitors 608, 609, which correspond to the capacitors 312, 313 in FIG. 2, and also has clamp circuits 603, 604 having a function of eliminating noise components as is the case with the differential circuit 515 in FIG. 3.

The clamp circuits 603, 604 are connected to the vertical output line 310 via switches 601, 602 corresponding to the switches 314, 315 in FIG. 2, and are also connected to a vertical output line 607 via switches 605, 606 corresponding to the switches 316, 317 in FIG. 2. It should be understood, however, that there is no intention to limit the structure of the pixel 309 to the one shown in FIG. 5. Note that, in FIG. 5, parts similar to those described with reference to FIG. 2 are denoted by the same reference numerals.

Although the clamp circuits 603, 604 are provided as shown in FIG. 6, amplification signals including noise components are held in clamp capacitors 608, 609, and the noise components are then held in clamp capacitors 610, 611. The noise components are subtracted from the amplification signals including the previously held noise components to thereby output amplification signals including no noise component to the horizontal output line 607.

Thus, it is possible to reduce the shift in storage timing by providing the capacitors the number of which corresponds to that of the photodiodes 301, 302, in front of the switches 605, 606 as stated above.

To form an image by picking up an object image in the above-described first to fourth embodiments, the following operation is carried out.

After the transfer switches 307, 308 are turned on at the same time, or after the electric charges in one photodiode 301 are transferred to the floating diffusion 305, electric charges in the other photodiode 302 are transferred without resetting the floating diffusion 305. Therefore, the floating diffusion 305 adds the electric charges in the photodiodes 301, 302 to form an image according to a signal obtained by the addition.

Thus, in the structure according to the first to fourth embodiments, focusing is detected from respective signals transferred from the photodiodes 301, 302 by the phase difference detecting system, and an image can be formed based on high-sensitive signals acquired by adding signals in the photodiodes 301, 302.

According to the first to fourth embodiments described above, the two photodiodes 301, 302 are connected to one source follower circuit serving as an amplification means. It should be understood, however, that there is no intention to limit the present invention to it. For example, one photodiode may be connected one source follower circuit or connected to no source follower circuit although electric charges cannot be added in such the case.

Figure 7:
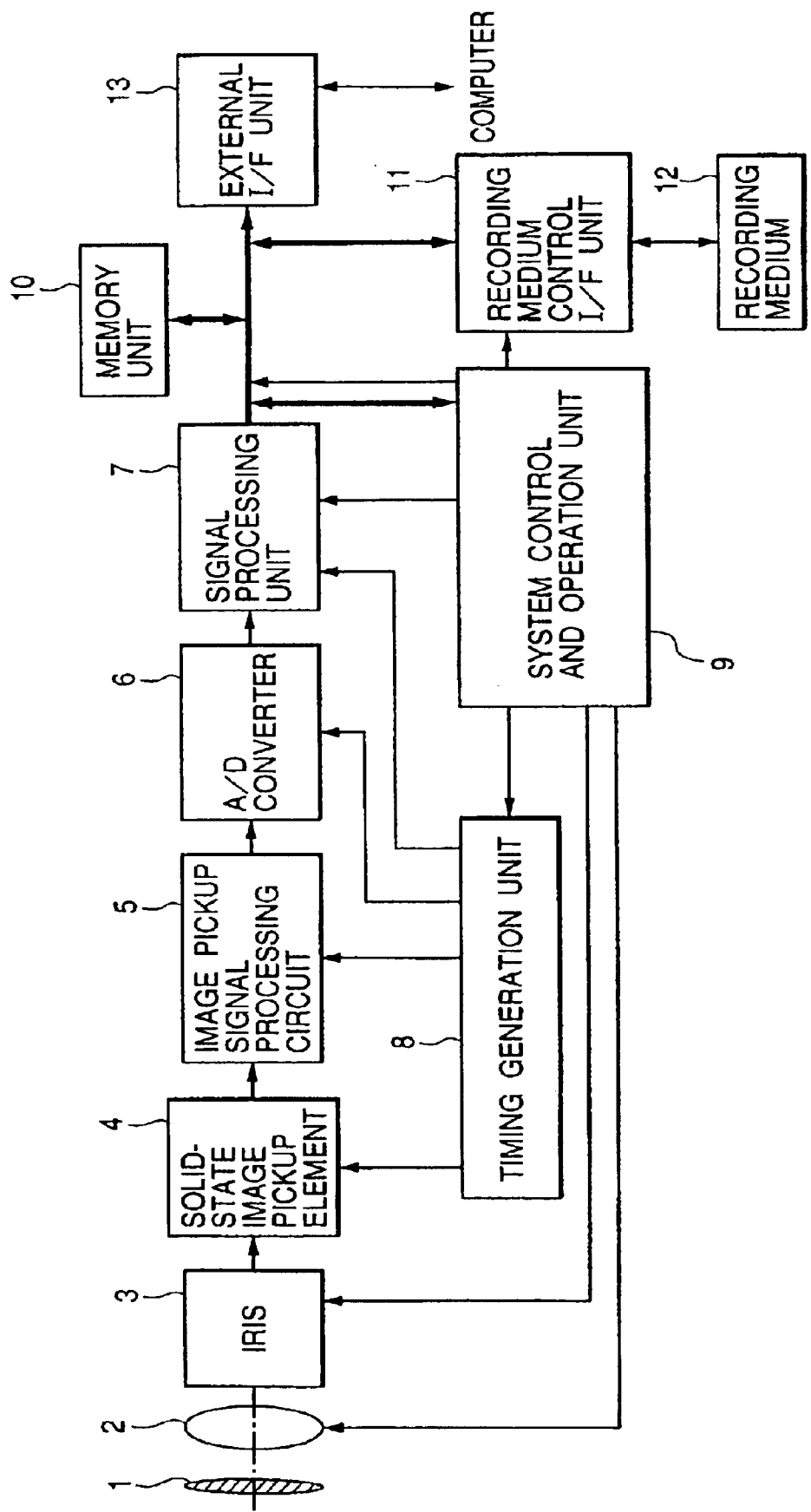
FIG. 7 is a block diagram showing the solid-state image pickup element according to a fifth embodiment of the present invention.

FIG. 7 is a diagram showing the structure of an image pickup apparatus using the solid-state image pickup element according to any one of the first to fourth embodiments. In FIG. 7, reference numeral 1 denotes a barrier that is used to protect a lens and is also used as a main switch; 2, a lens that forms an optical image of an object on a solid-state image pickup element 4; 3, an iris for varying the quantity of light transmitted through the lens; 4, a solid-state image pickup element for capturing an object image formed on the lens 2 as an image signal; 5, an image pickup signal processing circuit that performs various kinds of correcting operations, clamping operations, etc. on an image signal outputted from the solid-state image pickup element 4; 6, an A/D converter that converts an image signal outputted from the solid-state image pickup element 4 from analog form to digital form; 7, a signal processing unit that performs various kinds of correcting operations on image data outputted form the A/D converter 6 and compresses data; 8, a timing generation unit that outputs a variety of timing signals to the solid-state image pickup element 4, the image pickup signal processing circuit 5, the A/D converter 6 and the signal processing unit 7; 9, a system control and operation unit that controls a variety of operations and a still video camera as a whole; 10, a memory unit for temporarily storing image data; 11, a recording medium control I/F unit for use in recording or reading out image data in or from a recording medium; 12, a detachable recording medium such as a semiconductor memory for use in recording or reading out image data; and 13, an external interface (I/F) unit for use in communicating with an external computer and the like.

There will now be described the photographing operation of the still video camera of the above-mentioned structure. When the barrier 1 is opened, a main power source is turned on. A power source for a control system is then turned on, and a power source for an image pickup circuit such as the A/D converter 6 is turned on.

Then, the system control and operation unit 9 opens the iris 3 so as to control the exposure, and a signal outputted form the solid-state image pickup element 4 is outputted to the A/D converter 6 through the image pickup signal processing circuit 5. The A/D converter 6 converts the signal from analog form to digital form, and then outputs the converted signal to the signal processing unit 7. The signal processing unit 7 calculates the exposure according to the data in the system control and operation unit 9.

The brightness is determined according to the result of the photometry, and the system control and operation unit 9 controls the iris 3 according to the determined brightness.

The system control and operation unit 9 then calculates a distance to the object based on signals outputted from the solid-state image pickup element 4 (i.e. signals read out independently from the photoelectric conversion element 301 and the photoelectric conversion element 302). The lens is then driven to determine whether the lens is focused or not. If it is determined that the lens is not focused, the lens is driven again to measure the distance to the object.

After it is determined that the lens is focused, the main exposure is started. On completion of the exposure, an image signal outputted from the solid-state image pickup element 4 (i.e. a signal acquired by adding a signal from the photoelectric conversion element 301 and a signal from the photoelectric conversion element 302) is corrected, etc. in the image pickup signal processing circuit 5, and is then converted from analog form to digital form by the A/D converter 6. The image signal is stored in the memory unit 10 via the signal processing unit 7 under the control of the system control and operation unit 9. The data stored in the memory unit 10 is then recorded in the detachable recording medium 12 such as a semiconductor memory via the recording medium control I/F unit 11 under the control of the system control and operation unit 9. Alternatively, the data stored in the memory unit 10 may be inputted directly to a computer or the like so that image processing operations can be performed on the data.

There will now be described the sixth embodiment of the present invention with reference to FIG. 8 to FIG. 12.

Figure 8:
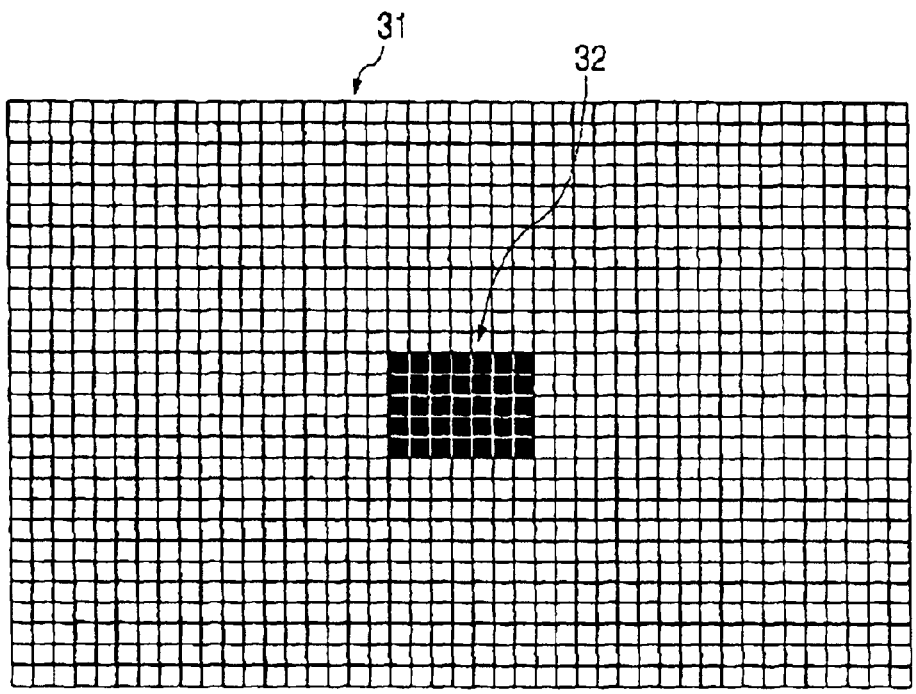
FIG. 8 is a diagram showing a structure of an image pickup area of the solid-state image pickup element according to a sixth embodiment of the present invention.

FIG. 8 is a diagram showing the structure of an image pickup area in the solid-state image pickup element according to the first embodiment of the present invention. FIG. 8 shows an image pickup area where a plurality of pixels that have a photoelectric converting function are arranged in lines or in a matrix. In FIG. 8, a region 32 in an image pickup area 31 is used for distance measurement and image pickup, and the other region in the image pickup area 31 is used only for image pickup. According to the present embodiment, each pixel in the region 32 is composed of a pixel whose photoelectric conversion element is divided into a plurality of parts (painted over with black in FIG. 8). Each pixel in the other region in the image pickup area 31 is composed of a pixel whose photoelectric conversion element is not divided.

Figure 9:
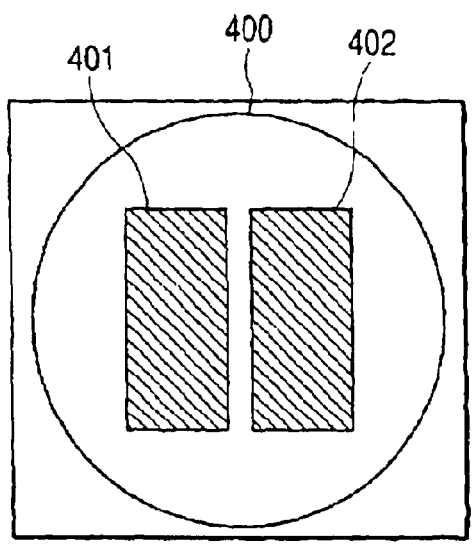
FIG. 9 is a diagram showing a structure of a pixel according to the sixth embodiment of the present invention.

FIG. 9 shows a pixel whose photoelectric conversion element is divided into a plurality of parts. The photoelectric conversion element can be divided in a variety of ways: e.g., division by an apparatus such as a LOCOS, division by a light-shielding layer, and division by simply joining impurities forming the photoelectric conversion element. Photoelectric conversion elements 401, 402 are provided for a microlens 400. That is, a plurality of photoelectric conversion elements are provided for one microlens. According to the present embodiment, a CMOS type solid-state image pickup element is supposed as the solid-state image pickup element. A transfer switch, a reset switch, a readout switch, a selection switch, a diffusion region, and so forth are omitted from FIG. 9.

Figure 10:
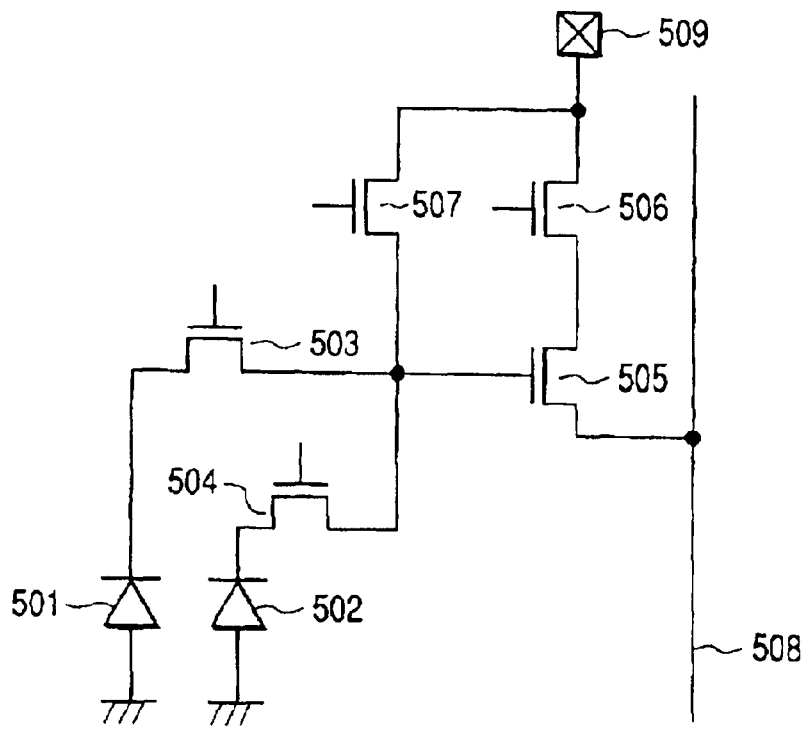
FIG. 10 is a circuit diagram showing an equivalent circuit of the pixel according to the sixth embodiment of the present invention.

FIG. 10 shows an example of an equivalent circuit in a pixel unit. In FIG. 10, the respective one ends of a photoelectric conversion element 501 and a photoelectric conversion element 502 are connected to a gate of a source follower input MOS transistor 505 via a transfer MOS transistor 504. A drain of the source follower input MOS transistor is connected to a source of a selection MOS transistor 506. A source of the source follower input MOS transistor is connected to a vertical signal line 508. A drain of the selection MOS transistor 506 is connected to a power source 509. A reset MOS transistor 507 is used for resetting electric charges stored in the photoelectric conversion element. In the equivalent circuit of the present embodiment, a signal voltage is generated at the gate of the source follower input MOS transistor according to the electric charges stored in the photoelectric conversion element, and a source follower circuit amplifies the electric charges thereof, which are then read out by the vertical signal line 508.

Figure 11:
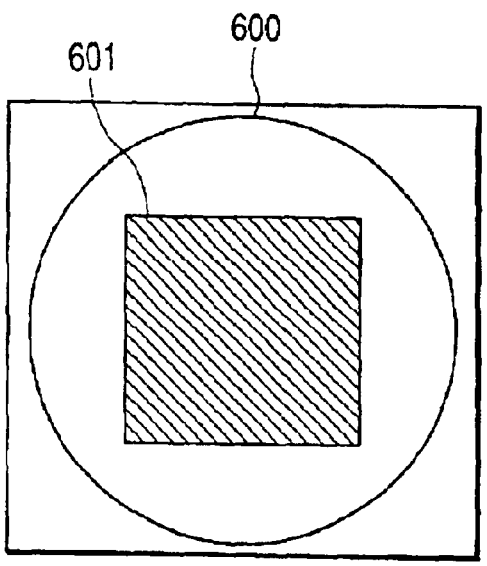
FIG. 11 is a diagram showing the structure of the pixel according to the sixth embodiment of the present invention.

FIG. 11 shows a pixel whose photoelectric conversion element is not divided. A photoelectric conversion element 601 is provided for a microlens 600. A transfer switch, a reset switch, a readout switch, a selection switch, a diffusion region, and so forth are omitted from FIG. 11.

Figure 12:
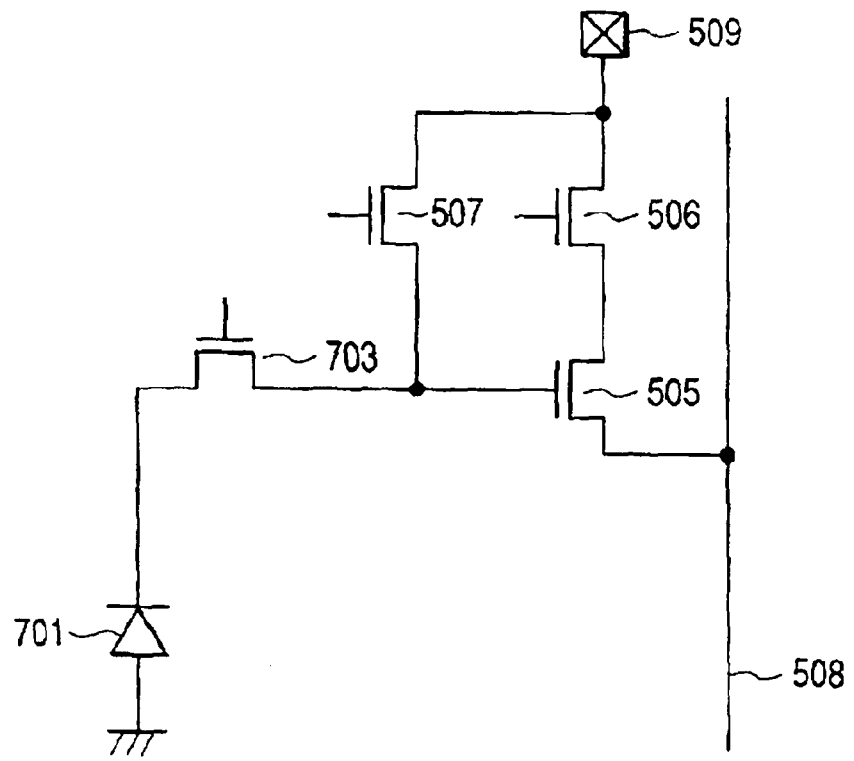
FIG. 12 is a circuit diagram showing the equivalent circuit of the pixel according to the sixth embodiment of the present invention.

FIG. 12 shows an equivalent circuit in a pixel unit. In FIG. 12, parts similar to those described in FIG. 10 are denoted by the same reference numerals. A pixel in a region that is used only for image pickup is different from a pixel in a region that is used for distance measurement and image pickup, in that the pixel has one photoelectric conversion element and one transfer MOS transistor. In FIG. 12, there are provided a photoelectric conversion element 701 and a transfer MOS transistor 703.

It should be understood, however, that there is no intention to limit the configuration of the circuit to the present embodiment and it is possible to adopt another configuration. According to the present embodiment, a CMOS type solid-state image pickup element is supposed as the solid-state image pickup element, but it should be understood that there is no intention to limit the present invention to it. For example, it is possible to use other solid-state image pickup elements such as a CCD.

Figure 13:
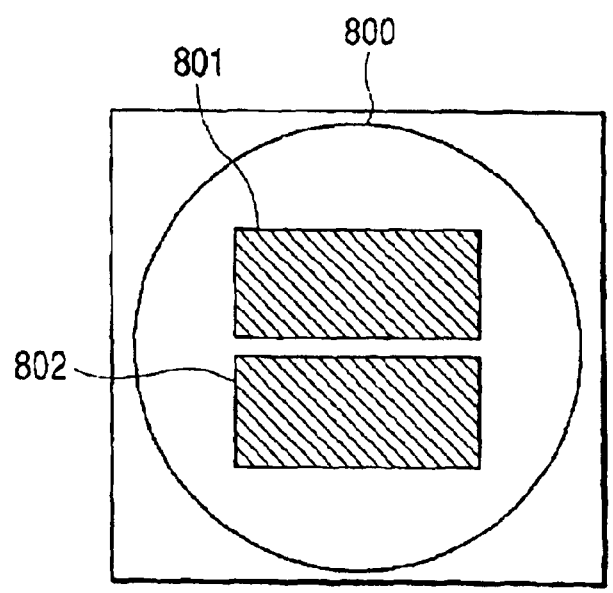
FIG. 13 is a diagram showing another structure of the pixel according to the sixth embodiment of the present invention.
Figure 14:
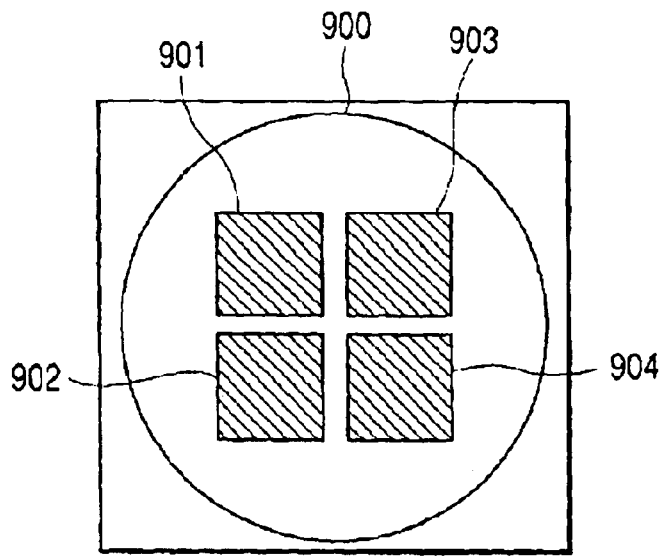
FIG. 14 is a diagram showing yet another structure of the pixel according to the sixth embodiment of the present invention.

According to the present embodiment, the photoelectric conversion element of the pixel in the region used for distance measurement and image pickup is horizontally divided into two parts as shown in FIG. 9. In this case, however, it is possible to detect in a horizontal direction only a difference in a position in frequency components of an image to be exposed. It should be understood, however, that there is no intention to limit the method of dividing a photoelectric conversion element of a pixel in the region used for the distance measurement and the image pickup to it. For example, a photoelectric conversion portion of a pixel in a region used for the distance measurement and the image pickup may be vertically divided into two parts as shown in FIG. 13 so as to detect a phase difference in frequency components in the vertical direction. Further, a photoelectric conversion portion of a pixel in a region used for the distance measurement and the image pickup may be divided into four parts as shown in FIG. 14 so as to detect a phase difference in frequency components in the horizontal and vertical directions. A transfer switch, a reset switch, a readout switch, a selection switch, a diffusion region, etc. are omitted from FIGS. 13 and 14.

According to the present embodiment, the region for use in the distance measurement is composed of a pixel whose photoelectric conversion elements is each divided into a plurality of parts, and the other region is composed of a pixel whose photoelectric conversion elements is not divided. This realizes a solid-state image pickup element with less sensitivity drop and less sensitivity ununiformity throughout an image pickup area in use for the distance measurement and the image pickup.

By equalizing the shape and area of a pixel whose photoelectric conversion element is divided into a plurality of parts and a pixel whose photoelectric conversion element is not divided, the pixel whose photoelectric conversion element is divided into a plurality of parts can be used for image pickup as an equivalent to the pixel whose photoelectric conversion element is not divided.

By equalizing the shape and area of the pixels, it is possible to keep the periodicity in pixel regions and to obtain an equivalent to a pixel whose photoelectric conversion element is not divided in positional information on an image. For example, the photoelectric conversion element is divided in FIG. 9 whereas the photoelectric conversion element is not divided in FIG. 11, but it is possible to maintain the periodicity in the pixel regions since the pixels have the same shape and area. It should be noted that a pixel whose photoelectric conversion element is divided can be used for image pickup by adding a signal from a divided photoelectric conversion element.

On the other hand, if the distance measurement takes priority, the area of a pixel whose photoelectric conversion element is divided into a plurality of parts is determined to be larger than the area of a pixel whose photoelectric conversion element is not divided. This enables the distance measurement with a high sensitivity. To the contrary, if the area of a pixel whose photoelectric conversion element is divided into a plurality of parts is determined to be smaller than the area of a pixel whose photoelectric conversion element is not divided, it is possible to measure the distance to an object having higher spatial frequency components.

In a pixel having the equivalent circuit shown in FIG. 10, if the transfer MOS transistor 503 reads out the results of the photoelectric conversion carried out by the photoelectric conversion element 501, and the transfer MOS transistor 504 then reads out the results of the photoelectric conversion carried out by the photoelectric conversion element 502, it is possible to separately read out the results of the photoelectric conversion carried out by the photoelectric conversion element 501 and the results of the photoelectric conversion carried out by the photoelectric conversion element 502 in the distance measurement. In the image pickup operation, the transfer MOS transistors 503, 504 are turned on at the same time to add and read out the results of the photoelectric conversion carried out by the photoelectric conversion elements 501, 502.

It should be noted that a diffusion region serving as an input unit of the source follower input MOS transistor is used as a means for adding the results of the photoelectric conversion. Signal charges are transferred from the transfer MOS transistor to this diffusion region through the photoelectric conversion element.

It should be understood, however, that there is no intention to limit the method to it. For example, a signal line may be provided for the respective parts divided from a photoelectric conversion element in a pixel. This makes it possible to separately read out the results of the photoelectric conversion and carry out the addition outside the pixel. Thus, a solid-state image pickup apparatus that has a distance measurement function and an image pickup function can be implemented by separately reading out the results of the photoelectric conversion by the respective parts divided from a photoelectric conversion element in a pixel and then adding and reading out them to pick up an image.

Further, the time required for the distance measurement can be reduced by using a solid-state image pickup element such as a CMOS type solid-state image pickup element that is capable of arbitrarily selecting pixels whose photoelectric conversion results should be read out, and reading out the results of the photoelectric conversion of pixels only in a region used for the distance measurement and the image pickup, during measurement of the distance.

Figure 15:
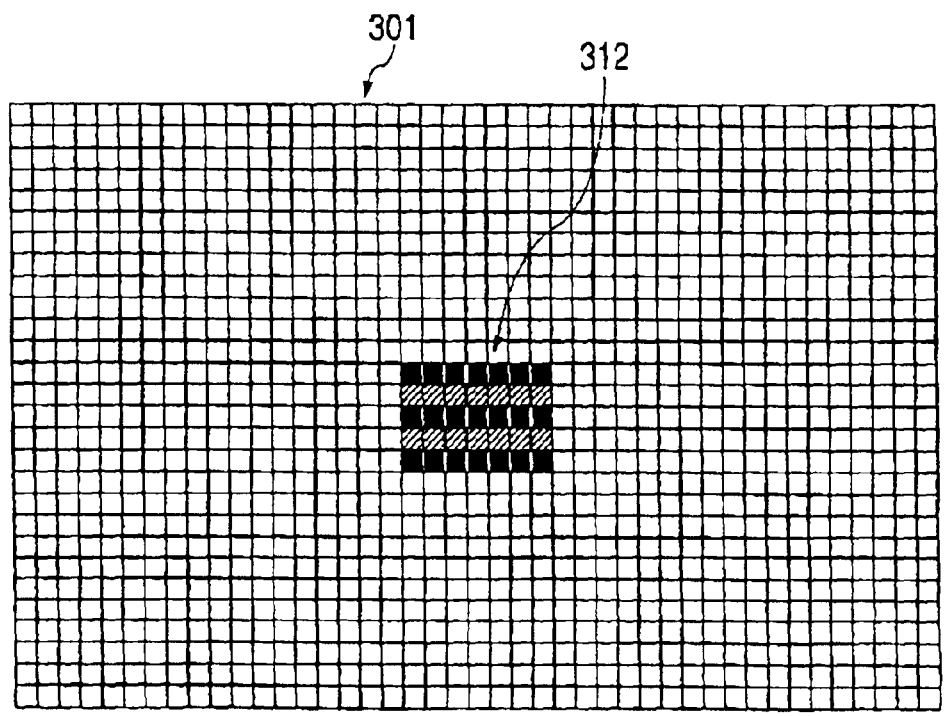
FIG. 15 is a diagram showing the structure of the image pickup area of the solid-state image pickup element according to a seventh embodiment of the present invention.
Figure 16:
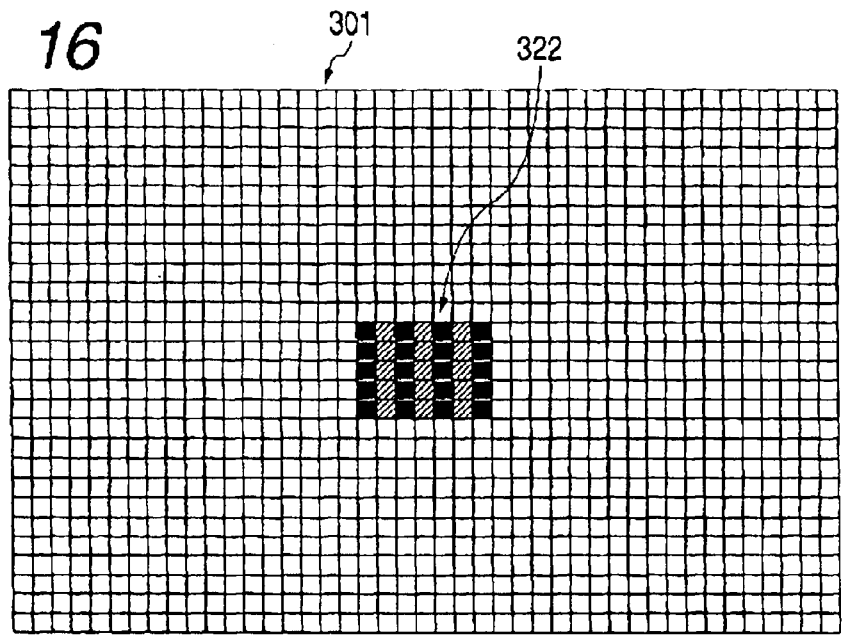
FIG. 16 is a diagram showing another structure of the image pickup area of the solid-state image pickup element according to the seventh embodiment of the present invention.

There will now be described the seventh embodiment of the present invention with reference to FIGS. 15 to 17.

According to the above-described sixth embodiment, all the pixels in the regions for use in the distance measurement and the image pickup are composed of a pixel which photoelectric conversion elements is divided into a plurality of parts. The present invention may be applied to a solid-state image pickup element whose region for use in the distance measurement and the image pickup is partially composed of a pixel whose photoelectric conversion elements is divided into a plurality of parts. For example, if a pixel whose photoelectric conversion elements is each horizontally divided into two parts as shown in FIG. 9 is used, the same effects as that of the first embodiment can be achieved by arranging those pixels in a part of the region 312 (horizontally painted over with black in FIG. 15) for use in the distance measurement and the image pickup as shown in FIG. 15. If a pixel whose photoelectric conversion portions is vertically divided into two parts as shown in FIG. 13 is used, the same effects as that of the fifth embodiment can be achieved by arranging those pixels in a part of the region 322 (vertically painted over with black in FIG. 16) for use in the distance measurement and the image pickup as shown in FIG. 16. According to the present embodiment, the number of pixels whose photoelectric conversion elements are each divided into a plurality of parts is reduced in the region that is used for both the distance measurement and the image pickup, and this implements a solid-state image pickup element that has the distance measuring function and the image pickup function and whose sensitivity drop and sensitivity ununiformity are small throughout an image pickup area.

Figure 17:
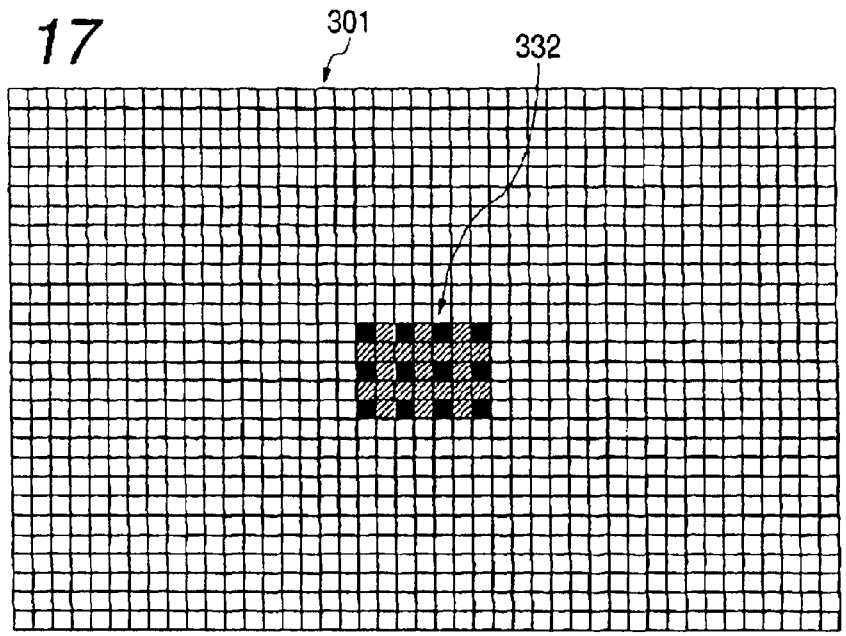
FIG. 17 is a diagram showing yet another structure of the image pickup area of the solid-state image pickup element according to the seventh embodiment of the present invention.

Further, as shown in FIG. 17, the number of pixels may be reduced in the horizontal and vertical directions by arranging in a thin-out manner pixels whose photoelectric conversion elements are each divided into a plurality of parts, in a part of the region 332 (painted over with black at intervals of one pixel in FIG. 17) for use in the distance measurement and the image pickup as shown in FIG. 17.

Figure 18:
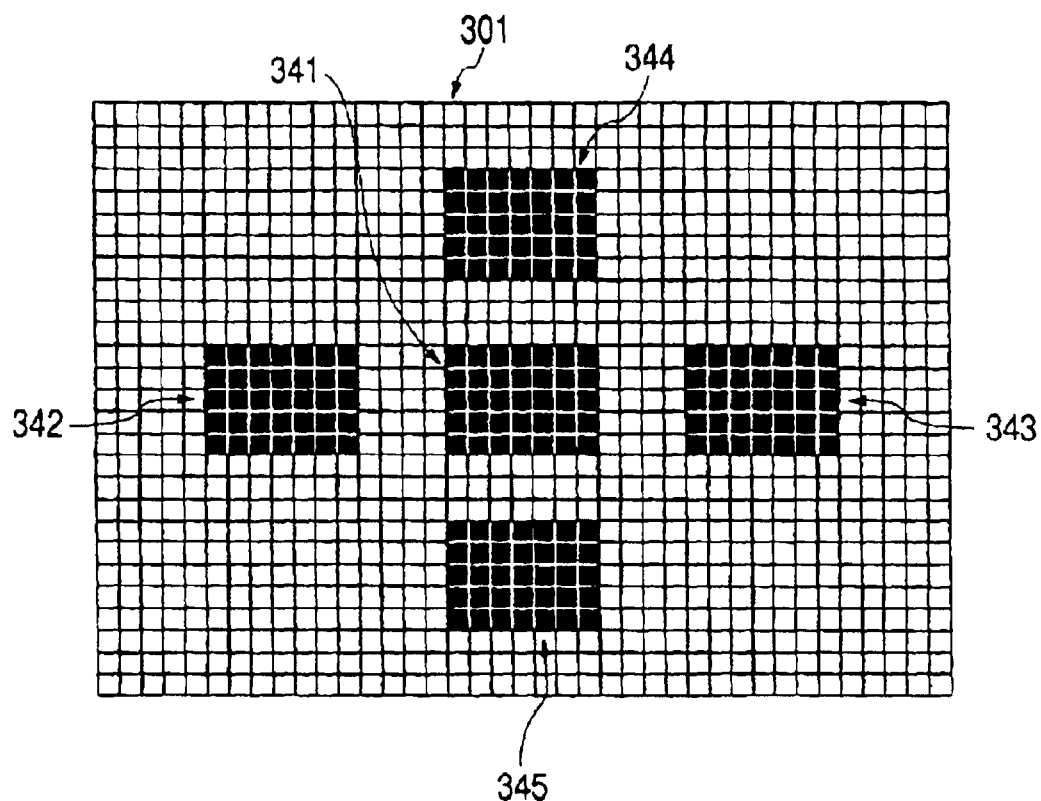
FIG. 18 is a diagram showing the image pickup area of the solid-state image pickup element according to an eighth embodiment of the present invention.

There will be described the eighth embodiment of the present invention with reference to FIG. 18.

The effects of the present embodiment will now be described. According to the sixth and seventh embodiments described above, there is only one region for use in the distance measurement and the image pickup as shown in FIG. 8 and FIGS. 15 to 17. In this case, it is only possible to measure the distance of a portion of an image to be captured. According to the present embodiment, however, a plurality of regions 341 to 345 for use in the distance measurement and the image pickup is provided in a picture plane of a solid-state image pickup element as shown in FIG. 18 so as to form a corresponding number of distance measurement points. It should be understood, however, that there is no intention to limit the number of regions for use in the distance measurement and the image pickup and the arrangement within the picture plane to those in FIG. 18. Further in FIG. 18, for example, it is possible to detect a phase difference in frequency components in the horizontal and vertical directions by using the pixel shown in FIG. 14 in the region 341, detect a phase difference in frequency components in the horizontal direction using the pixel shown in FIG. 9 in the regions 342, 343, and detect a phase difference in frequency components in the vertical direction using the pixel shown in FIG. 13 in the regions 344, 345.

There will now be described the ninth embodiment of the present invention with reference to FIG. 19.

As is the case with the sixth embodiment of the present invention described previously, the sensitivity drop and the sensitivity ununiformity can be reduced throughout an image pickup area if a region for use in the distance measurement is composed of a pixel whose photoelectric conversion elements is divided into a plurality of parts, and the other region is composed of a pixel whose photoelectric conversion elements is not divided. However, the region for use in the distance measurement and the image pickup element in a picture plane is composed of a pixel whose photoelectric conversion elements is divided into a plurality of parts, and this causes the sensitivity drop and the sensitivity ununiformity. The present embodiment is intended to reduce the sensitivity drop and the sensitivity ununiformity.

Figure 19:
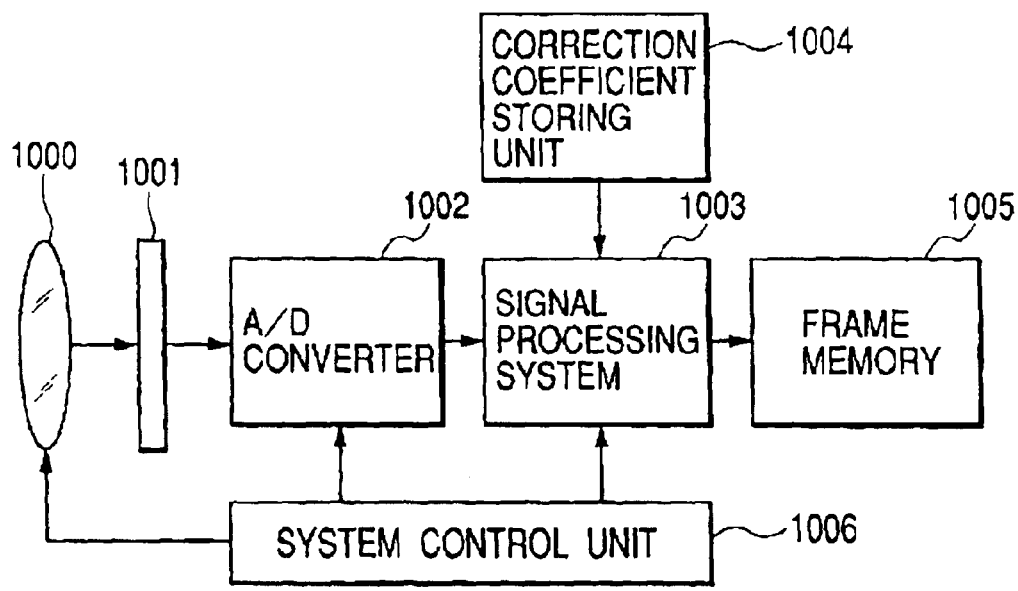
FIG. 19 is a block diagram showing an image pickup apparatus according to a ninth embodiment of the present invention.

FIG. 19 is a block diagram showing the structure of an image pickup apparatus according to the present embodiment. FIG. 19 is useful in explaining the image pickup and the correction of signals, but the descriptions of the distance measurement are omitted from FIG. 19. A solid-state image pickup element 1001 is driven by a driver (not shown) and receives light from a lens 1000 and outputs the result of photoelectric conversion to an A/D converter 1002. The A/D converter 1002 converts the result of the photoelectric conversion from analog form to digital form and outputs the converted result to a signal processing system 1003. The signal processing system corrects a signal of a pixel whose photoelectric conversion elements is divided into a plurality of parts, among the outputs from the A/D converter 1002 according to correction coefficients corresponding to the respective pixels. On this occasion, the correction coefficients corresponding to the respective pixels are calculated in advance in view of the positions of pixels and an arbitrary optical system. The correction coefficients corresponding to the respective pixels are stored as a map or a plurality of values for all the pixels or pixels in one region, in a correction coefficient storing unit 1004. A frame memory 1005 stores the signals outputted from the signal processing system 1003, i.e., the corrected images. A system control unit 1006 controls each block of the image pickup apparatus.

Examples of factors relating to the arbitrary optical system are a lens for use in image pickup, an iris of the lens, the position of a pupil, and the shape of a microlens.

According to the present embodiment, there is provided a means for storing a plurality of correction coefficients corresponding to a plurality of optical systems and the image pickup conditions such as the magnification, as a map or a plurality of values representing all the pixels or pixels in one region in the correction coefficient storing unit 1004 to recognize an optical system in the image pickup. A correction coefficient is selected according to the recognized information to perform correction of signals. This enables the image pickup corresponding to a plurality of lenses.

It should be understood, however, that the structure shown in the block diagram of FIG. 19 is only an example of the present invention and there is no intention to limit the structure of the image pickup apparatus to it. For example, the correction coefficient storing unit may be integrated with the solid-state image pickup apparatus.

In the solid-state image pickup element according to the present embodiment, it is possible to reduce the sensitivity drop and the sensitivity ununiformity, caused in the case where the image pickup element is composed of a pixel whose photoelectric conversion elements is divided into a plurality of parts.

According to the present embodiment, the photoelectric conversion element corrects a signal of a pixel whose photoelectric conversion elements is divided into a plurality of parts, but there is no intention to limit the present invention to it. The same effects can be achieved in the case where a signal of a pixel whose photoelectric conversion elements is not divided is corrected or signals of all pixels are corrected.

For example, if the sensitivity of the divided pixel is 0.9 times the sensitivity of the undivided pixel, the output of the divided pixel is multiplied by 1/0.9 so that the output of the divided pixel can be equal to the output of the undivided pixel. To the contrary, the output of the divided pixel is multiplied by 0.9 so that the output of the divided pixel can be equal to the output of the undivided pixel. If signals of all pixels are corrected, other correcting operations such as shading are performed at the same time to reduce the burden of the signal processing.

According to the present embodiment, the correction coefficients are calculated in advance, but it should be understood that there is no intention to limit the present invention to it. The correction coefficients may be calculated in any methods; for example, a user may set the correction coefficients, or a manufacturer may preset the correction coefficients before shipment of products. For example, relative sensitivities of individual pixels are stored as correction coefficients by preliminary image pickup, etc., and the results of photoelectric conversion for the individual pixels are corrected according to the correction coefficients. This enables the accurate correction suitable for the image pickup conditions.

In addition, results obtained by an arbitrary filter processing operation are stored as correction coefficients, and signals can be corrected according to these correction coefficients. A variety of methods may be used for carrying out the arbitrary filter processing operation. For example, an arithmetic operation such as an equalizing operation and a median filter operation is carried out to obtain only one value for all the pixels whose photoelectric conversion portions are not divided into a plurality of parts, or to obtain only one value for each of blocks provided by dividing pixels whose photoelectric conversion portions are not divided, into one or more blocks. The filter processing operation reduces the number of correction coefficients to be stored, and reduces the size of the correction coefficient storing unit.

There will now be described the technological advantages achieved by the above-described sixth to ninth embodiments.

A region for use in the distance measurement and the image pickup is composed of pixels whose photoelectric conversion elements are each divided into a plurality of parts, and the other region is composed of pixels whose photoelectric conversion elements are not divided. This realizes a solid-state image pickup element with less sensitivity drop and less sensitivity ununiformity throughout an image pickup area in use for the distance measurement and the image pickup.

Further, a part of a region for use in the distance measurement and the image pickup is composed of a pixel whose photoelectric conversion elements is divided into a plurality of parts, and the other region is composed of a pixel whose photoelectric conversion elements is not divided. This realizes a solid-state image pickup element with less sensitivity drop and less sensitivity ununiformity being small throughout an image pickup area in use for the distance measurement and the image pickup.

Further, a plurality of regions for use in the distance measurement and the image pickup are provided in a picture plane of the solid-state image pickup element, and this obtains a plurality of distance measuring points. The method of dividing a photometric conversion element is changed according to regions to thereby enable the distance measurement of an object having different spatial frequencies.

Further, signals of individual pixels are corrected according to correction coefficients corresponding to the respective pixels, and this enables the image pickup with a small sensitivity ununiformity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image pickup apparatus comprising:

first and second photoelectric conversion units each including a plurality of photoelectric conversion elements;

a first microlens provided for said first photoelectric conversion unit, for focusing light onto the plurality of photoelectric conversion elements included in said first photoelectric conversion unit;

a second microlens provided for said second photoelectric conversion unit, for focusing light onto the plurality of photoelectric conversion elements included in said second photoelectric conversion unit;

a first holding unit adapted to hold signals from said first photoelectric conversion unit, said first holding unit including at least the same number of first capacitors as the number of the plurality of photoelectric conversion elements included in said first photoelectric conversion unit, wherein said first capacitors hold the signals from said plurality of elements included in said first photoelectric conversion unit, respectively;

a second holding unit adapted to hold signals from said second photoelectric conversion unit, said second holding unit including at least the same number of second capacitors as the number of the plurality of photoelectric conversion elements included in said second photoelectric conversion unit, wherein said second capacitors hold the signals from said plurality of elements included in said second photoelectric conversion unit, respectively; and a first common output line to which signals from the plurality of first and second capacitors included in said first and second holding units, respectively, are read out sequentially, wherein the signals from said first photoelectric conversion unit are transferred to said first holding unit through a first switch and the signals from said second photoelectric conversion unit are transferred to said second holding unit through a second switch.

2. An image pickup apparatus according to claim 1, further comprising:

third and fourth photoelectric conversion units each including a plurality of photoelectric conversion elements;

a third microlens provided for said third photoelectric conversion unit, for focusing light onto the plurality of photoelectric conversion elements included in said third photoelectric conversion unit;

a fourth microlens provided for said fourth photoelectric conversion unit, for focusing light onto the plurality of photoelectric conversion elements included in said fourth photoelectric conversion unit;

a second common output line to which signals from said first and third photoelectric conversion units are read out sequentially;

a third common output line to which signals from said second and fourth photoelectric conversion units are read out sequentially;

wherein the plurality of capacitors included in said first holding unit hold the signals from said second common output line, and the plurality of capacitors included in said second holding unit hold the signals from said third common output line, and wherein the signals from said third photoelectric conversion unit are transferred to said first holding unit through said first switch and the signals from said fourth photoelectric conversion unit are transferred to said second holding unit through said second switch.

3. An image pickup apparatus according to claim 1, wherein each of said first and second photoelectric conversion units include an amplification unit adapted to amplify and output signals from the plurality of photoelectric conversion elements of said first and second photoelectric conversion units, said amplification unit being provided as a common amplification unit for the plurality of photoelectric conversion elements of said first and second photoelectric conversion units.

4. An image pickup apparatus according to claim 1,
wherein each of said first and second holding units includes a capacity for holding at least the same number of noise signals as that of the plurality of photoelectric conversion elements; and
wherein said image pickup apparatus further comprises a differential circuit adapted to subtract the noise signals from signals including photoelectric conversion signals generated by the photoelectric conversion elements.

5. An image pickup apparatus according to claim 1, further comprising a control circuit adapted to perform focus adjustment based on a plurality of signals outputted sequentially from said first common output line.

6. An image pickup apparatus according to claim 1, further comprising microlenses provided one for each of the plurality of photoelectric conversion elements.

7. An image pickup apparatus comprising:
an image pickup area including a plurality of first photoelectric conversion elements and a second photoelectric conversion element;
a first microlens provided for the plurality of first photoelectric conversion elements included in said image pickup area;
a second microlens provided for the second photoelectric conversion element included in said image pickup area; and
a common output line to which signals from the plurality of first photoelectric conversion elements and a signal from the second photoelectric conversion element are read out,
wherein said image pickup apparatus is arranged so that focusing is adjusted using the signals from the first photoelectric conversion elements but not the signal from the second photoelectric conversion element.

8. An image pickup apparatus according to claim 7, further comprising a drive circuit having a mode for reading out, independently, the signals from the plurality of first photoelectric conversion elements and a mode for adding and reading out the signals from the plurality of first photoelectric conversion elements.

* * * * *